(12) United States Patent
Yu et al.

(10) Patent No.: US 8,374,275 B2
(45) Date of Patent: Feb. 12, 2013

(54) METHOD AND SYSTEM FOR COMMUNICATION CHANNEL OPTIMIZATION IN A MULTIPLE-INPUT MULTIPLE-OUTPUT (MIMO) COMMUNICATION SYSTEM

(75) Inventors: Qian Yu, Singapore (SG); Ping Luo, Singapore (SG); Masayuki Hoshino, Kadoma (JP)

(73) Assignee: Panasonic Corporation (JP)

( * ) Notice: Subject to any disclaimer, the term of this patent is extended or adjusted under 35 U.S.C. 154(b) by 486 days.

(21) Appl. No.: 12/514,515

(22) PCT Filed: Jun. 23, 2007

(86) PCT No.: PCT/SG2007/000176
§ 371 (c)(1),
(2), (4) Date: Nov. 25, 2009

(87) PCT Pub. No.: WO2009/002269
PCT Pub. Date: Dec. 31, 2008

(65) Prior Publication Data
US 2010/0142633 A1 Jun. 10, 2010

(51) Int. Cl.
*H04B 7/02* (2006.01)
*H04B 7/06* (2006.01)
*H04L 27/00* (2006.01)

(52) U.S. Cl. .................................. 375/267; 375/299

(58) Field of Classification Search .................. 375/219, 375/260, 267, 299; 455/562.1; 370/328
See application file for complete search history.

(56) References Cited

U.S. PATENT DOCUMENTS

| 2005/0101259 | A1 | 5/2005 | Tong et al. |
| 2006/0120478 | A1 | 6/2006 | Kim et al. |
| 2007/0064829 | A1* | 3/2007 | Zheng et al. .................. 375/267 |
| 2007/0160162 | A1* | 7/2007 | Kim et al. .................... 375/267 |
| 2008/0165875 | A1* | 7/2008 | Mundarath et al. .......... 375/260 |

FOREIGN PATENT DOCUMENTS
EP 1 619 808 A2 1/2006
WO 02/078211 A2 10/2002

* cited by examiner

*Primary Examiner* — Betsy Deppe
(74) *Attorney, Agent, or Firm* — Dority & Manning, P.A.

(57) ABSTRACT

A transmission method in a multiple-input multiple-output (MIMO) communication system, a transmitter in a MIMO communication system and a MIMO communication system are provided. The method comprises the steps of: receiving feedback data representing channel state information from respective receivers of the MIMO communication system; grouping the receivers into one or more groups based on the received feedback data; obtaining a precoding matrix for each group of receivers based on the received feedback data such that precoding vectors or sub-matrices in the precoding matrix associated with respective receivers of said each group of receivers are orthogonal to each other; and applying the precoding matrix to input signals for transmission to said each group of receivers.

27 Claims, 7 Drawing Sheets

METHOD AND SYSTEM FOR COMMUNICATION CHANNEL OPTIMIZATION IN A MULTIPLE-INPUT MULTIPLE-OUTPUT (MIMO) COMMUNICATION SYSTEM

FIELD OF INVENTION

The invention relates broadly to a transmission method in a multiple-input multiple-output (MIMO) communication system, to a transmitter for a MIMO communication system and to a MIMO communication system.

BACKGROUND

A multiple-input multiple-output (MIMO) communication system typically uses technologies for providing high channel performance through wireless fading channels. It is desired that channel performance be improved for MIMO communication systems. This includes providing optimal-quality channels to users and increasing data throughput using multi-user diversity.

A closed loop MIMO system typically transmits channel state information from a receiver to a transmitter. Thus, precoding/beamforming can provide channel optimization by utilizing the channel state information feedback from the receiver. However, transmitting the channel state information typically uses bandwidth that could otherwise be available for transmitting data traffic.

With regard to precoding, current precoding methods for multiuser (MU)-MIMO systems are typically based on a block diagonalization algorithm which utilizes precoding to force an efficient channel to be in the form of a block diagonal matrix and then to typically cancel inter-user interference only. However, when using these methods, the orthogonality between spatial beams is typically not guaranteed and therefore, such channel optimization methods are typically not efficient. In addition, there is also typically a constraint on the dimension of the antenna configuration in such MIMO systems, the constraint being the number of transmitting antennas should not be smaller than the total number of receiving antennas. One problem that may arise when using these methods is that this constraint is typically not satisfied in practical cases.

One alternative precoding method is described in US 2006/0120478. As described therein, the method performs QR decomposition on channel information being fed back from a receiver using singular value decomposition (SVD) and performs beamforming based on the QR decomposition results. However, using this method, the interferences of other users typically can not be cancelled by the beamforming. Since there is typically no other users' channel information in each receiver, it is practically difficult to eliminate inter-user interference at each receiver. Thus, high data throughput cannot be practically achieved using this precoding method.

In the above precoding methods, the channel state information of each receiver in MU-MIMO systems is typically directly fed back from the receivers to the transmitter for calculating a precoding matrix. Thus, one problem that may arise is that the increased feedback overhead typically results in bandwidth non-efficiency.

With regard to reducing feedback overhead, there are a number of methods that utilize codebooks known to both the transmitter and receiver. The codebooks typically contain precoding information that the transmitter may use for precoding. The receiver identifies the codebook elements for the transmitter to use by transmitting indices identifying the codebook elements. However, these codebook-based precoding methods are typically only used for single user (SU)-MIMO systems since there is no other users' channel information available in each receiver in MU-MIMO systems. In other words, in MU-MIMO systems, the receivers typically cannot identify the codebook elements to be used for precoding in the transmitter directly.

Hence, there exists a need for a method and system for communication channel optimization in a multiple-input multiple-output (MIMO) communication system to address at least one of the above problems.

SUMMARY

In accordance with a first aspect of the present invention, there is provided a transmission method in a multiple-input multiple-output (MIMO) communication system, the method comprising the steps of: receiving feedback data representing channel state information from respective receivers of the MIMO communication system; grouping the receivers into one or more groups based on the received feedback data; obtaining a precoding matrix for each group of receivers based on the received feedback data such that precoding vectors or sub-matrices in the precoding matrix associated with respective receivers of said each group of receivers are orthogonal to each other; and applying the precoding matrix to input signals for transmission to said each group of receivers.

The feedback data may comprise one or more determinant columns of respective right singular matrices of channel matrices derived at the respective receivers.

The method may further comprise determining numbers of streams, $t_k$, assigned to the respective receivers, and wherein the feedback data may comprise the first $t_k$ columns of the right singular matrices derived at the respective receivers.

If t is a number of transmission antennas of a transmitter in the MIMO communication system, the receivers may be grouped into said one or more groups, each group comprising less than or equal to t receivers.

The obtaining of the precoding matrix may comprise computing the precoding vectors or sub-matrices for each receiver of each group as lying in the null space constructed using said one or more determinant columns of the respective right singular matrices derived at respective other receivers of said each group.

The method may further comprise deriving respective right singular matrices of channel matrices at the respective receivers, comparing the derived right singular matrices with matrices in a codebook, determining codebook elements closest to the derived respective right singular matrices, and wherein the feedback data representing the channel state information may comprise respective indices identifying the codebook elements.

The method may further comprise determining numbers of streams, $t_k$, assigned to the respective receivers, and the codebook elements for the respective receivers are ($t \times t_k$) matrices, where t is the number of transmitter antennas in the MIMO communication system, and the first $t_k$ columns of the right singular matrices derived at the respective receivers may be compared with the respective codebooks for determining the closest codebook elements.

The grouping of the receivers and obtaining the precoding matrices for the respective groups may comprise grouping receivers having orthogonal codebook elements identified therewith, and constructing the precoding matrix from the respective orthogonal codebook elements.

The method may further comprise t as a number of transmission antennas of a transmitter in the MIMO communication system, and each group of receivers may comprise less than or equal to t receivers.

In accordance with a second aspect of the present invention, there is provided a transmitter for a multiple-input multiple-output (MIMO) communication system, the transmitter comprising a control module for receiving feedback data representing channel state information from respective receivers of the MIMO communication system; a scheduler unit for grouping the receivers into one or more groups based on the received feedback data, said scheduler unit being capable of obtaining a precoding matrix for each group of receivers based on the received feedback data such that precoding vectors or sub-matrices in the precoding matrix associated with respective receivers of said each group of receivers are orthogonal to each other; and a precoding module for applying the precoding matrix to input signals for transmission to said each group of receivers.

The feedback data may comprise one or more determinant columns of respective right singular matrices of channel matrices derived at the respective receivers.

The scheduler unit may determine numbers of streams, $t_k$, assigned to the respective receivers, and wherein the feedback data comprises the first $t_k$ columns of the right singular matrices derived at the respective receivers.

If t is a number of transmission antennas of the transmitter, the scheduler unit may group the receivers into said one or more groups, each group comprising less than or equal to t receivers.

The obtaining of the precoding matrix may comprise computing the precoding vectors or sub-matrices for each receiver of each group as lying in the null space constructed using said one or more determinant columns of the respective right singular matrices derived at respective other receivers of said each group.

The feedback data from each receiver representing the channel state information may comprise an index identifying one codebook element in a codebook, and wherein said codebook element may be determined as being closest to a right singular matrix of a channel matrix derived at said each receiver by comparing the derived right singular matrix with matrices in said codebook.

The scheduler unit may determine numbers of streams, $t_k$, assigned to the respective receivers whereby the codebook elements for the respective receivers are ($t \times t_k$) matrices, where t is the number of transmitter antennas in the MIMO communication system, and the first $t_k$ columns of the right singular matrices derived at the respective receivers may be compared with the respective codebooks for determining the closest codebook elements.

The scheduler unit may group receivers having orthogonal codebook elements identified therewith, and construct the precoding matrix from the respective orthogonal codebook elements.

If t is a number of transmission antennas of the transmitter in the MIMO communication system, each group of receivers may comprise less than or equal to t receivers.

In accordance with a third aspect of the present invention, there is provided a multiple-input multiple-output (MIMO) communication system, the MIMO communication system comprising at least one transmitter; one or more receivers deriving feedback data from signals received from the at least one transmitter and transmitting the feedback data to the at least one transmitters; wherein each transmitter comprises, a control module for receiving the feedback data representing channel state information from respective receivers of the MIMO communication system; a scheduler unit for grouping the receivers into one or more groups based on the received feedback data, said scheduler unit being capable of obtaining a precoding matrix for each group of receivers based on the received feedback data such that precoding vectors or sub-matrices in the precoding matrix associated with respective receivers of said each group of receivers are orthogonal to each other; and a precoding module for applying the precoding matrix to input signals for transmission to said each group of receivers.

The feedback data may comprise one or more determinant columns of respective right singular matrices of channel matrices derived at the respective receivers.

The scheduler unit may determine numbers of streams, $t_k$, assigned to the respective receivers, and wherein the feedback data may comprise the first $t_k$ columns of the right singular matrices derived at the respective receivers.

If t is a number of transmission antennas of the transmitter, the scheduler unit may group the receivers into said one or more groups, each group comprising less than or equal to t receivers.

The obtaining of the precoding matrix may comprise computing the precoding vectors or sub-matrices for each receiver of each group as lying in the null space constructed using said one or more determinant columns of the respective right singular matrices derived at respective other receivers of said each group.

The feedback data from each receiver representing the channel state information may comprise an index identifying one codebook element in a codebook, and wherein said codebook element may be determined as being closest to a right singular matrix of a channel matrix derived at said each receiver by comparing the derived right singular matrix with matrices in said codebook.

The scheduler unit may determine numbers of streams, $t_k$, assigned to the respective receivers whereby the codebook elements for the respective receivers are ($t \times t_k$) matrices, where t is the number of transmitter antennas in the MIMO communication system, and the first $t_k$ columns of the right singular matrices derived at the respective receivers may be compared with the respective codebooks for determining the closest codebook elements.

The scheduler unit may group receivers having orthogonal codebook elements identified therewith, and construct the precoding matrix from the respective orthogonal codebook elements.

If t is a number of transmission antennas of the transmitter in the MIMO communication system, each group of receivers may comprise less than or equal to t receivers.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
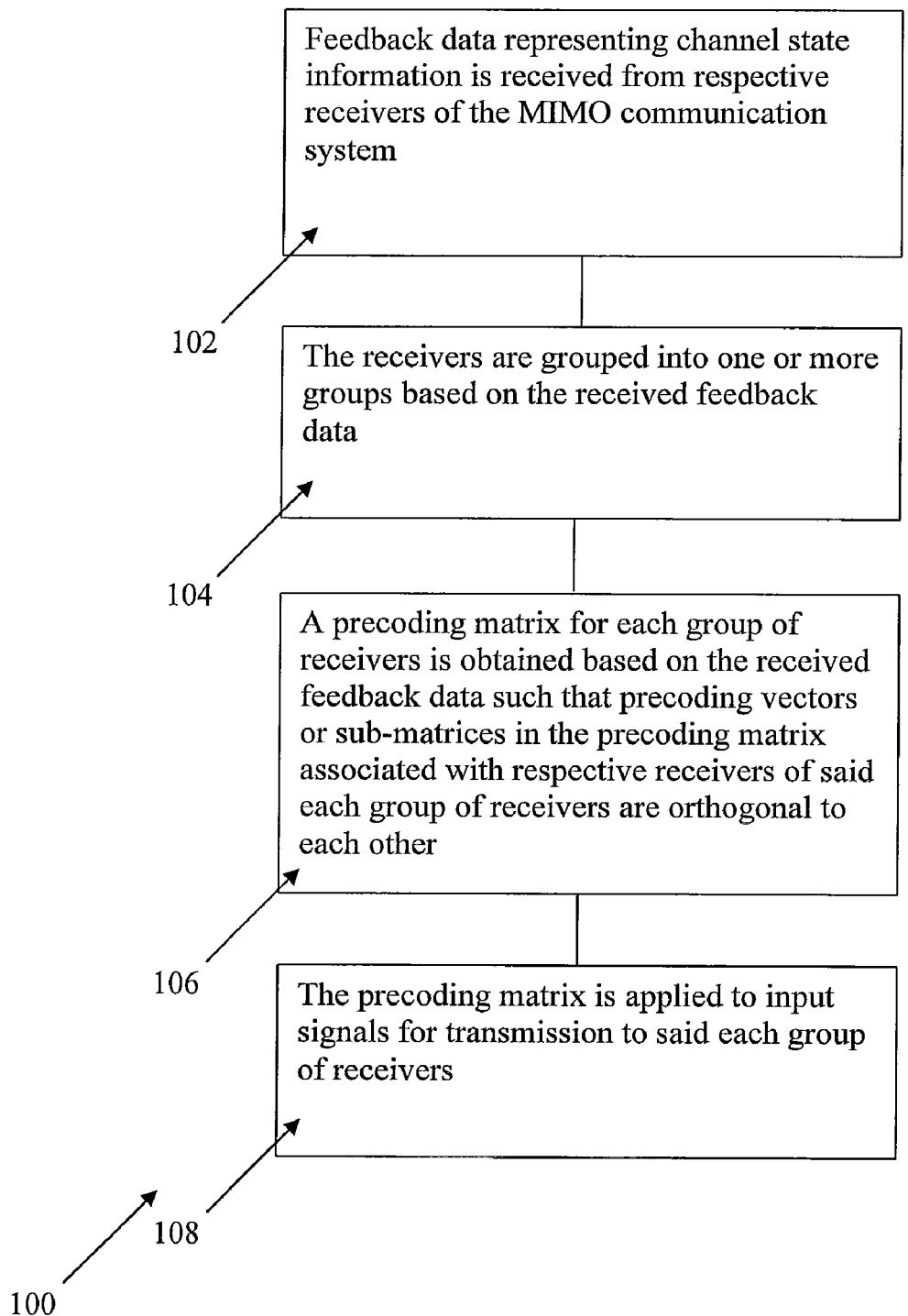
FIG. 1 is a schematic flowchart illustrating a transmission method in a multiple-input multiple-output (MIMO) communication system.

Example embodiments described below may enhance the performance of communication channels in a communication system and improve, for example, the transmission performance of multi-user MIMO communication systems.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computing system, or similar electronic device, that manipulates and transforms data represented as physical quantities within the computing system into other data similarly represented as physical quantities within the computing system or other information storage, transmission or display devices.

The present specification also discloses an apparatus for performing the operations of the methods. Such apparatus may be specially constructed for the required purposes, or may comprise a general purpose computer or other devices selectively activated or reconfigured by a computer program stored in the computer. The algorithms presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program, and a data storage medium having a computer program stored thereon, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

FIG. 1 is a schematic flowchart 100 illustrating a transmission method in a multiple-input multiple-output (MIMO) communication system. At step 102, feedback data representing channel state information is received from respective receivers of the MIMO communication system. At step 104, the receivers are grouped into one or more groups based on the received feedback data. At step 106, a precoding matrix for each group of receivers is obtained based on the received feedback data such that precoding vectors or sub-matrices in the precoding matrix associated with respective receivers of said each group of receivers are orthogonal to each other. At step 108, the precoding matrix is applied to input signals for transmission to said each group of receivers.

In an example embodiment, one or more receivers obtain channel state information based on reference signals received from a transmitter. Each receiver performs SVD on the channel state information and feedbacks to the transmitter column information of the right singular matrix resulting from the SVD. The transmitter then forms a precoding matrix based on the column information. The column information may be in the form of matrices/vectors. The transmitter applies precoding weights to data signals using the precoding matrix. The precoding weights may be based on full or partial channel state information. At each receiver, data signals are received and decoded using filter matrices and an inverse of the precoding matrix. This may provide a subset of the data signals and the subset being only the data signals intended for the receiver.

In another embodiment, codebook based precoding is used. In such an example embodiment, the column information is referenced using a codebook. In such an embodiment, the transmitter receives the codebook element indices fed back from each receiver and performs grouping of signals intended for the receivers into a plurality of groups in which the codebook elements indicated by feedback indices are orthogonal among these receivers. The transmitter then schedules the grouped signals to time-frequency resources and assembles the codebook elements associated with the grouped signals to form respective precoding matrices and thereby performing precoding.

In the description below, an overview of a transmitter and one or more receivers in a multiuser MIMO system for implementing example embodiments of the present invention is first provided followed by a more detailed description of algorithms used for the precoding in example embodiment.

Figure 2:
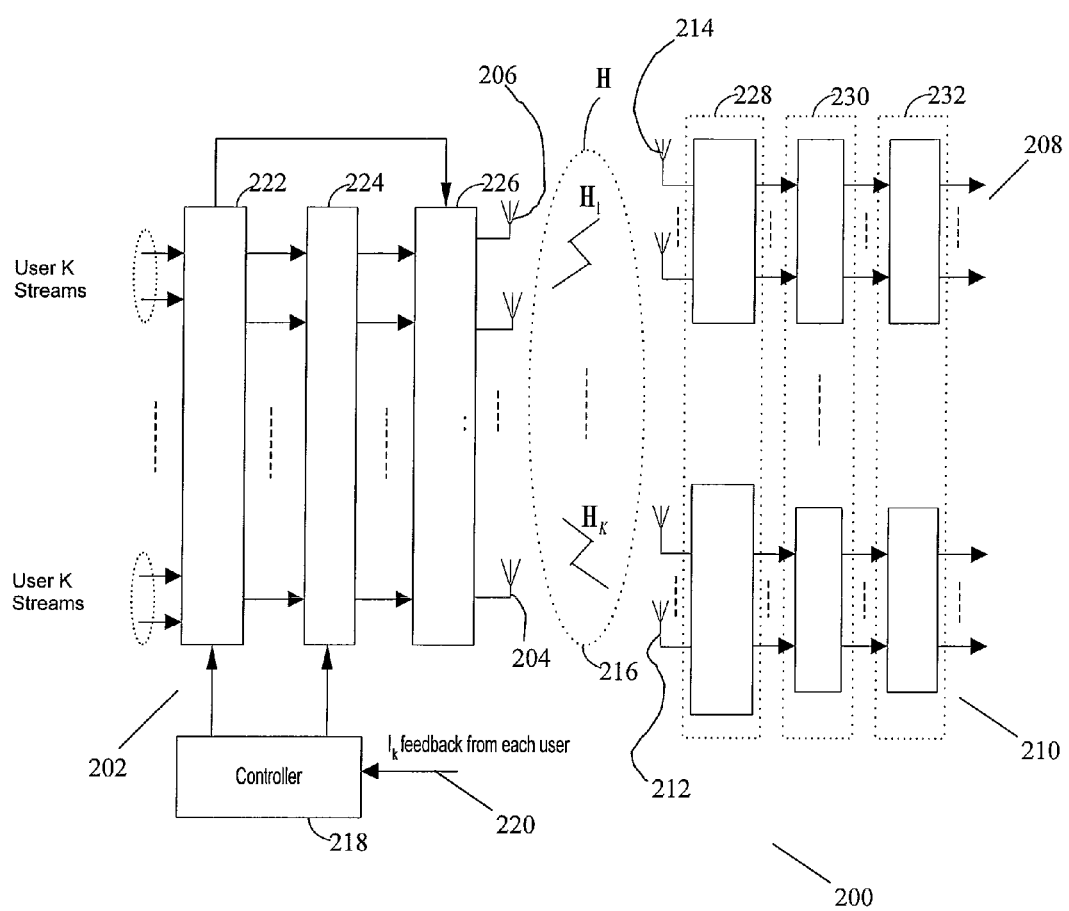
FIG. 2 is a schematic block diagram illustrating a multiuser MIMO communication system.

FIG. 2 is a schematic block diagram illustrating a multiuser MIMO communication system 200 for implementing example embodiments of the present invention. The system 200 comprises a transmitter 202 having a plurality of transmission antennas e.g. 204, 206 and one or more receivers e.g. 208, 210 each having a plurality of reception antennas e.g. 212, 214. Data streams are transmitted from the transmitter 202 to the receivers e.g. 208, 210 over a multiuser MIMO channel 216.

At the transmitter 202, a controller 218 is provided to receive, at numeral 220, feedback channel information and one or more channel quality indicators from each receiver e.g. 208, 210. The transmitter 202 further comprises a scheduler 222, an adaptive modulation and coding (AMC) module 224 and a precoder 226. In one embodiment, forming the precoding matrix comprises calculating the precoding vector/sub-matrix for each receiver by making the precoding vector/sub-matrix lie in the null space constructed by determinant columns of right singular matrices transmitted from other ones of the group of receivers. The precoding vector/sub-matrices for the receivers are then assembled to form the precoding matrix.

In another embodiment, if the channel information is fed back using one or more codebook element indices, the controller 218 locates respective feedback channel vectors/matrices from a codebook. The channel vectors/matrices are codebook elements identified using the indices. The scheduler 222 groups the receivers e.g. 208, 210 according to the feedback channel vectors/matrices, i.e. the scheduler 222 groups the receivers e.g. 208, 210 having feedback matrices/vectors which are orthogonal or near-orthogonal with each other and assembles the vectors to form a precoding matrix for this group of receivers. In one implementation, the transmitter 202 may select a maximum of t receivers to be grouped into one group, where t is the maximum number of available spatial streams. The scheduler 222 then selects a group of receivers with the highest priority for transmission according to a predetermined schedule policy, such as proportional fair (PF) scheduling or scheduling based on maximum throughput.

If no receivers can be grouped, the scheduler 222 calculates the throughput of all single users that use the transmit streams and chooses a receiver with the highest priority to schedule for transmission according to a schedule policy, such as PF scheduling or scheduling based on maximum throughput.

The AMC 224 performs modulation and channel coding for the data streams intended for transmission to scheduled receivers according to control information from the controller 218. The controller 218 provides the control information which decides the modulation and channel coding level for each spatial stream based on the channel quality indicators received from the receivers e.g. 208, 210. The precoder 226 performs precoding by applying the precoding matrix from the scheduler 222 corresponding to the scheduled group of receivers to the modulated and encoded signals from the AMC module 224.

At each receiver e.g. 208, 210, a processor 228, a detector 230 and a decoder 232 are provided. The processor 228 receives reference signals from the transmitter 202 and estimates the channel state information. The reference signals are pre-designed and inserted into data streams that are transmitted via transmit antennas e.g. 204, 206 from the transmitter 202. The processor 228 then performs SVD on the channel state information and feedbacks the determinant columns of the right singular matrix resulting from the SVD to the transmitter 202, in one example embodiment. In the example embodiment using a codebook, the processor 228 compares the right singular matrix to elements in the codebook to find a codebook element as a feedback vector/matrix which is closest to the right singular matrix and transmits a corresponding codebook element index to the transmitter 202. For choosing the feedback vector/matrix closest to the right singular matrix, distances between the determinant columns of the right singular matrix and codebook elements from the codebook are determined and the codebook element having the smallest distance from the determinant columns of the right singular matrix is chosen as the feedback vector/matrix. The detector 230 is used to detect the received signals using the inverse of the transmitter precoding matrix based on the channel state information. The detector 230 also calculates the channel quality indicator to feedback to the transmitter 202. The decoder 232 is used to demodulate and decode the subset of the detected plurality of data signals transmitted by the transmitter 202, the subset being only the data signals intended for the receiver e.g. 208, 210.

Details of the processing at the transmitter and receivers in different example embodiments will now be described.

Figure 3:
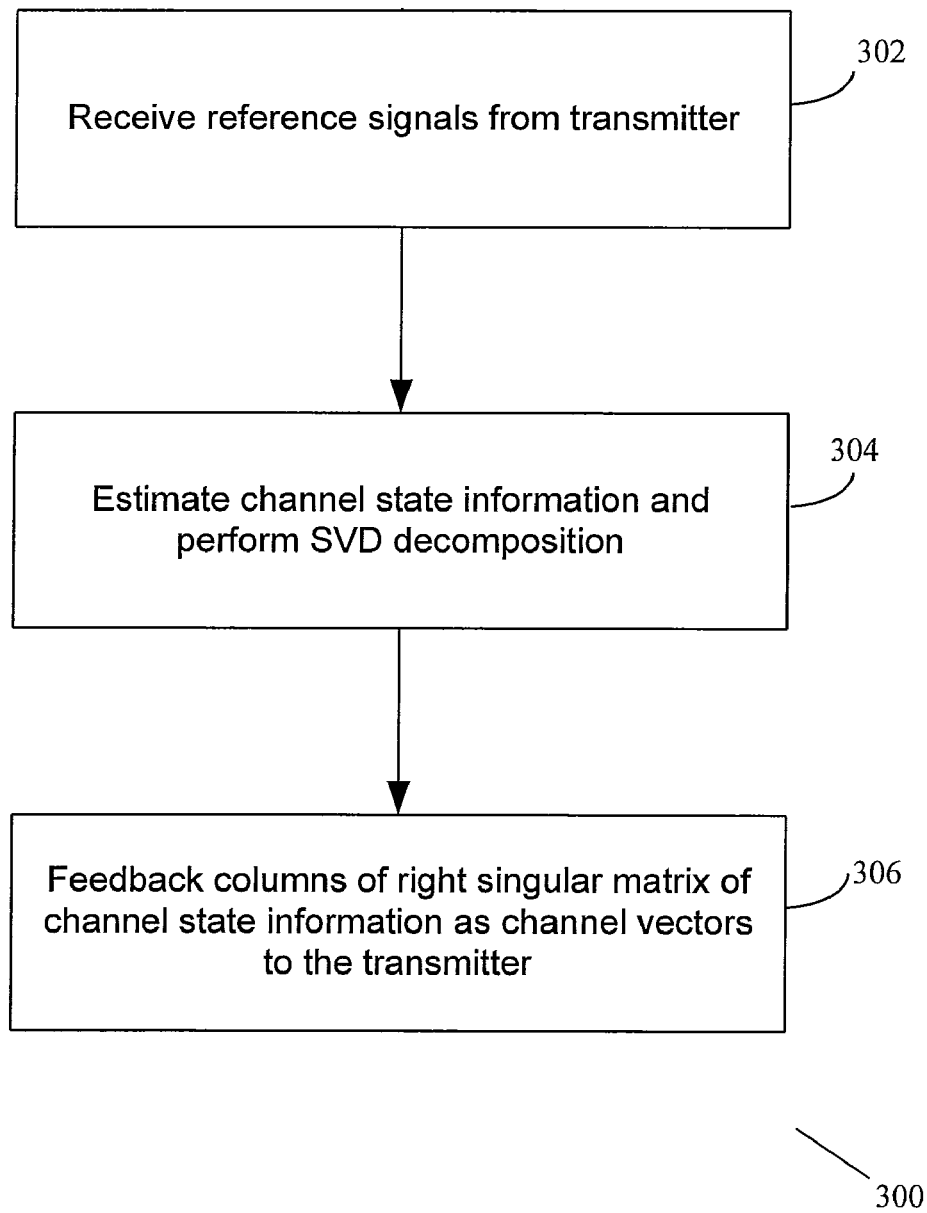
FIG. 3 is a schematic flowchart illustrating signal processing in a receiver in one example embodiment.

FIG. 3 is a schematic flowchart 300 illustrating signal processing in a receiver e.g. 208, 210 in one example embodiment. In the example embodiment, data communication is carried out on MU-MIMO channels using precoding for channel optimization. The receiver e.g. 208, 210 may be in a wireless MIMO communication device (not shown). At step 302, the receiver receives reference signals from the transmitter. At step 304, the receiver estimates the channel state information and measures an output signal-to-interference-plus-noise ratio (SINR). This may correspond to the receiver computing a current channel matrix describing the current state of the spatial channels. Based on the channel state information, a channel state information matrix is obtained. In the same step, the receiver performs SVD on the channel state information matrix to compute its right singular matrix. At step 306, the receiver feedbacks the determinant columns of the right singular matrix as channel vectors and the corresponding output SINR to the transmitter. If $t_k$ is the number of spatial streams intended to the receiver, the determinant columns of the right singular matrix are selected as the first $t_k$ columns from the right singular matrix.

Figure 4:
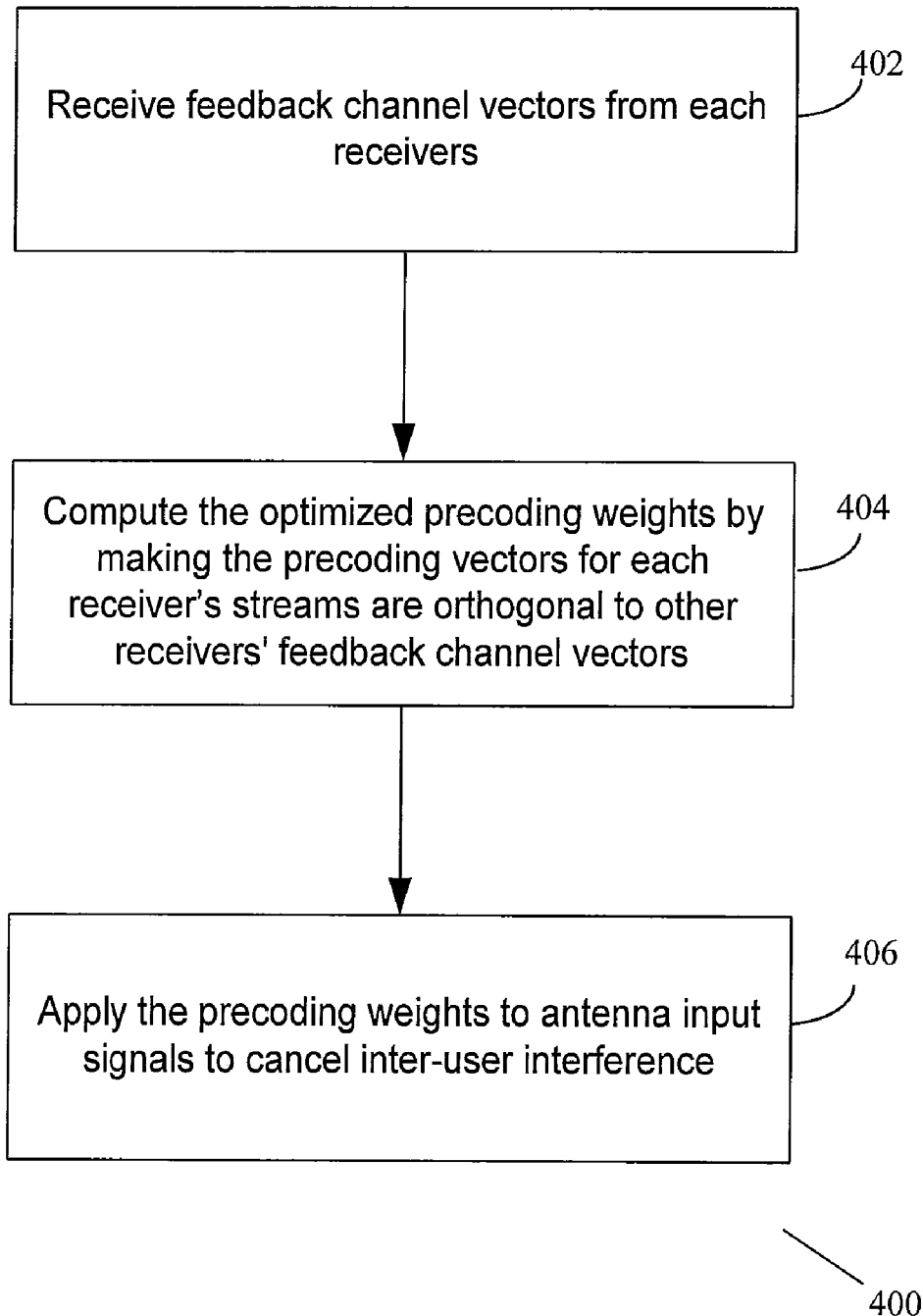
FIG. 4 is a schematic flowchart illustrating signal processing in a transmitter in the example embodiment.

FIG. 4 is a schematic flowchart 400 illustrating signal processing in the transmitter 202 (FIG. 2) for this example embodiment. The transmitter 202 may be in a wireless MIMO communication device (not shown). At step 402, the transmitter receives feedback channel vectors from the one or more receivers. At step 404, the transmitter computes precoding weights based on the feedback channel vectors. In other words, the precoding vectors for data streams intended for each receiver are computed to be orthogonal to the feedback channel vectors of other receivers. At step 406, the transmitter performs channel optimization by applying the precoding weights to the corresponding data signals intended for the scheduled receivers, to eliminate inter-user interference. In this example embodiment, the receivers are grouped into one or more groups, each group comprising less than or equal to t receivers, where t is the number of transmission antennas e.g. 204, 206, for transmission based on a scheduling policy.

Figure 5:
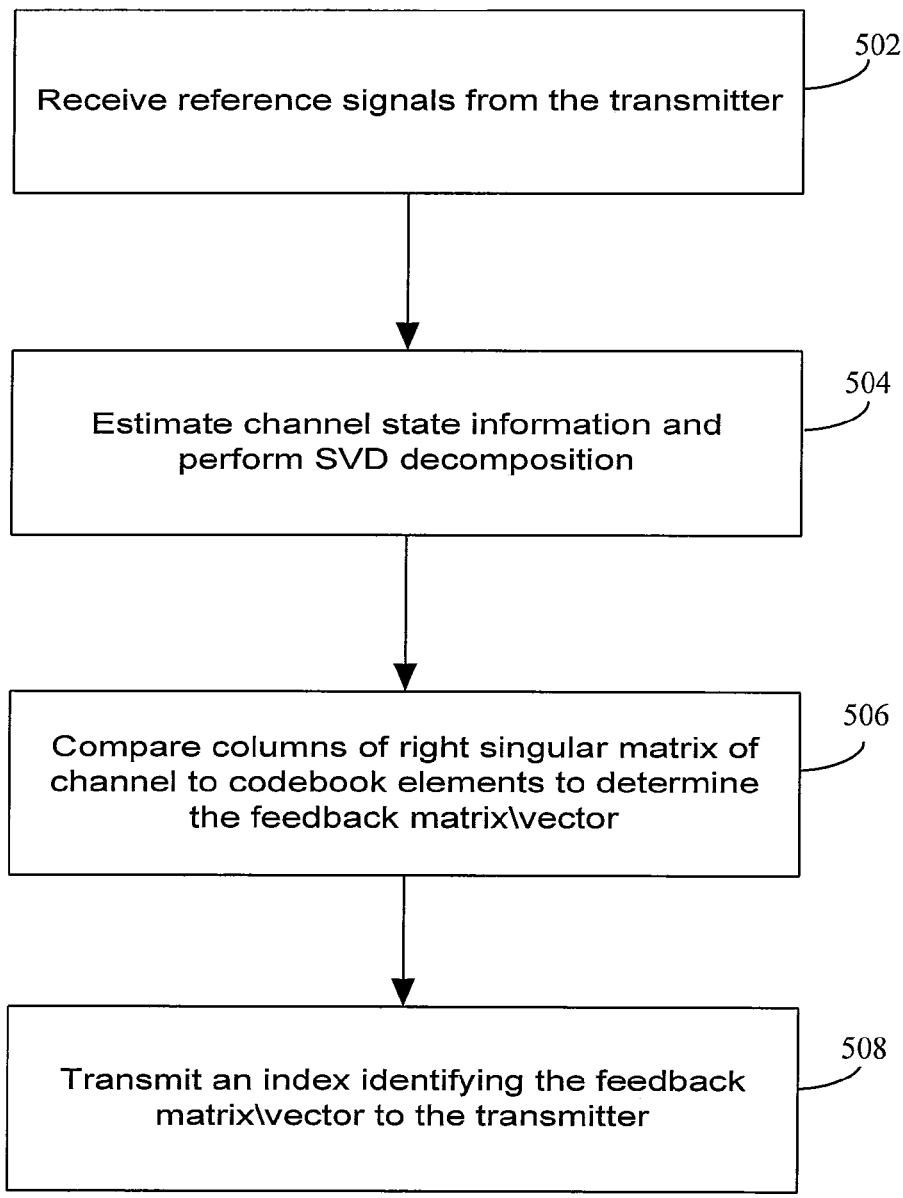
FIG. 5 is a schematic flowchart illustrating signal processing in a receiver in another example embodiment.

FIG. 5 is a schematic flowchart 500 illustrating signal processing in a receiver e.g. 208, 210 in another example embodiment. In this example embodiment, data communication is carried out on MU-MIMO channels using codebook based precoding. The receiver e.g. 208, 210 may be in a wireless MIMO communication device (not shown). At step 502, the receiver receives one or more reference signals from the transmitter. At 504, the receiver estimates the channel state information and measures an output SINR. This may correspond to the receiver computing a current channel matrix describing the current state of the spatial channels. In the same step, the receiver performs SVD on the channel matrix to compute the right singular matrix of the channel state information matrix. At step 506, the receiver compares the right singular matrix to elements in a codebook to find a feedback vector/matrix. The feedback vector\matrix may correspond to a column subset of the precoding matrix to be formed at the transmitter. At step 508, an index identifying the feedback vector/matrix is transmitted/feedback to the transmitter together with the corresponding output SINR.

Figure 6:
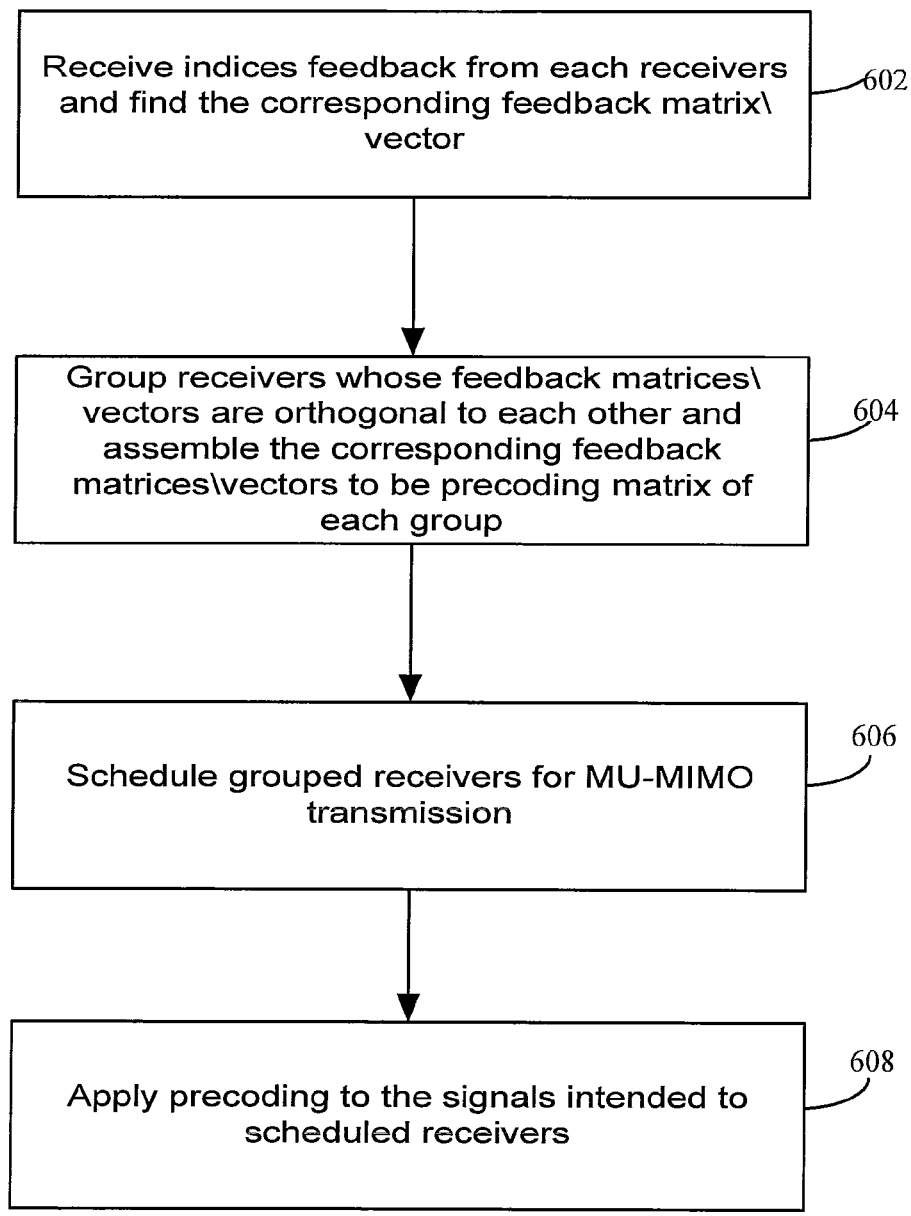
FIG. 6 is a schematic flowchart illustrating signal processing in a transmitter in the example embodiment.

FIG. 6 is a schematic flowchart 600 illustrating signal processing in the transmitter 202 for this example embodiment using codebook based precoding. The transmitter 202 may be in a wireless MIMO communication device (not shown). At step 602, the transmitter receives indices fed back from the one or more receivers and finds the corresponding elements from the codebook as feedback matrices/vectors. At step 604, the transmitter groups the receivers according to the feedback matrices/vectors. In other words, the transmitter groups the receivers having orthogonal feedback matrices/vectors, with up, to a maximum of t receivers in each group, where t is the number of transmission antennas e.g. 204, 206. In the same step, the transmitter assembles the vectors to form the precoding matrix for this group of receivers. At step 606, the transmitter selects a group of receivers with the highest priority for transmission according to a schedule policy. If there are no receivers that can be grouped, the transmitter calculates the throughput of all single users that use the transmit streams and chooses the receiver with the highest priority to schedule and transmit according to the schedule policy. At step 608, the transmitter applies the precoding matrix to the signals intended for transmission to the scheduled receivers.

A more detailed description of the algorithms used for the precoding in the example embodiments is provided below.

Referring back to FIG. 2, the transmitter 202 comprises a plurality, t, of transmission antennas e.g. 204, 206 and communicates with K receivers e.g. 208, 210, each receiver e.g. 208, 210 comprising a plurality, $r_k$, of reception antennas e.g. 212, 214. Thus, the total number of reception antennas r is $$r = \sum_{k=1}^{K} r_k \qquad (1)$$

If the number of parallel spatial streams assigned to the kth receiver is $t_k$, $$t = \sum_{k=1}^{K} t_k. \qquad (2)$$

A channel output of a receiver k is modeled as $$y_k = H_k s + z_k \qquad (3)$$

where s denotes a (t×1) input signal vector transmitted from the transmission antennas, e.g. 204, 206 to the receiver k, and $z_k$ denotes a ($r_k$×1) random noise vector applied to the receiver k. The ($r_k$×t) complex matrix $H_k$ denotes the channel between the transmitter 202 and the receiver k.

Therefore, the multi-user MIMO system 200 may be expressed as $$Y = Hs + Z \qquad (4)$$

where $Y = [y_1^T, y_2^T, \ldots y_K^T]^T$ is a vector of communication signals received at the K receivers e.g. 208, 210, and $Z = [z_1^T, z_2^T, \ldots z_K^T]^T$ is a vector of noise affecting the transmitted communication signals. H (r×t) is the MU-MIMO channel from the transmitter 202 to all K receivers e.g. 208, 210 and is concatenated by the channel $H_k$ (k=1, ..., K) between the transmitter 202 and each receiver e.g. 208, 210. That is $$H = \begin{bmatrix} H_1 \\ H_2 \\ \vdots \\ H_K \end{bmatrix} \qquad (5)$$

To obtain channel optimization to eliminate the inter-user interferences in the multiuser MIMO system 200, the MU-MIMO channel of equation (5) is decomposed into separate SU-MIMO channels by using a precoding W in the transmitter 202 and respective receiver filters P in the K receivers e.g. 208, 210. Thus, the resulting effective channel is a block diagonal matrix $$P^H HW = \begin{bmatrix} \Sigma_{r_1 \times t_1} & 0 & \cdots & 0 \\ 0 & \Sigma_{r_2 \times t_2} & \vdots & \vdots \\ \vdots & \vdots & \ddots & 0 \\ 0 & \cdots & 0 & \Sigma_{r_K \times t_K} \end{bmatrix} \qquad (6)$$

and $$P = \begin{bmatrix} P_1 & 0 & \cdots & 0 \\ 0 & P_2 & \vdots & \vdots \\ \vdots & \vdots & \ddots & 0 \\ 0 & \cdots & 0 & P_K \end{bmatrix} \qquad (7)$$

where $P_k$ (k=1, ..., K) is the filter matrix applied in each receiver e.g. 208, 210.

Thus, the system model expression of equation (4) becomes $$Y = (PHW)s + (P)Z \qquad (8)$$

That is, $$\begin{bmatrix} y_1 \\ y_2 \\ \vdots \\ y_K \end{bmatrix} = \begin{bmatrix} \Sigma_{r_1 \times t_1} & 0 & \cdots & 0 \\ 0 & \Sigma_{r_2 \times t_2} & \vdots & \vdots \\ \vdots & \vdots & \ddots & 0 \\ 0 & \cdots & 0 & \Sigma_{r_K \times t_K} \end{bmatrix} \begin{bmatrix} s_1 \\ s_2 \\ \vdots \\ s_K \end{bmatrix} + \overline{Z}$$

$$= \begin{bmatrix} \Sigma_{r_1 \times t_1} s_1 \\ \Sigma_{r_2 \times t_2} s_2 \\ \vdots \\ \Sigma_{r_K \times t_K} s_K \end{bmatrix} + \begin{bmatrix} \overline{z}_1 \\ \overline{z}_2 \\ \vdots \\ \overline{z}_K \end{bmatrix} \qquad (9)$$

where $s_k$ is a ($t_k$×1) input signal vector intended for the receiver k, and $\overline{z}_k$ is a ($r_k$×1) effective noise vector applied to the receiver k. $\Sigma_{r_k \times t_k}$ is the efficient channel between the transmitter 202 and the receiver k with precoding carried out in the transmitter 202 and filters P implemented in the K receivers e.g. 208, 210. As expressed in equation (9), with this type of channel optimization, the multiuser MIMO system 200 can be decomposed into separate SU-MIMO systems.

The design of the precoding matrix W in the transmitter 202 and the receiver filters P in the K receivers e.g. 208, 210 are described in the following. Subjecting the channel $H_k$ to SVD at each receiver e.g. 208, 210, the SVD may be expressed as $$H_k = U_k \Lambda_k V_k^H, k=1, \ldots, K \qquad (10)$$

where $U_k$ and $V_k$ are unitary matrices with ($r_k \times r_k$) and (t×t) dimensions respectively, and $\Lambda_k$ is a diagonal matrix with a ($r_k$×t) dimension. Thus, $U_k$ and $V_k$ are left and right singular matrixes of channel matrix $H_k$ respectively and $\Lambda_k$ contains the singular values of $H_k$ in its diagonal elements.

The filter matrix for each receiver e.g. 208, 210 is chosen as $$P_k = U_k, k=1, \ldots, K \qquad (11)$$

Therefore, using equations (5), (6) and (7), the effective channels between the transmitter 202 and each receiver k (k=1, ..., K) can be expressed as $$P_1^H H_1 W = U_1^H U_1 \Lambda_1 V_1^H W = \Lambda_1 V_1^H W = [\Sigma_{r_1 \times t_1} \quad 0 \quad \ldots \quad 0] \quad (12\text{-}1)$$

$$P_2^H H_2 W = U_2^H U_2 \Lambda_2 V_2^H W = \Lambda_2 V_2^H W = [0 \quad \Sigma_{r_2 \times t_2} \quad \ldots \quad 0] \quad (12\text{-}2)$$

$$\vdots$$

$$P_K^H H_K W = U_K^H U_K \Lambda_K V_K^H W = \Lambda_K V_K^H W = [0 \quad \ldots \quad 0 \quad \Sigma_{r_K \times t_K}] \quad (12\text{-}K)$$

At the transmitter 202, the pre-coding matrix W is based on the feedback channel information according to equations (12-1) to (12-K). Since $\Lambda_k$ is a diagonal matrix, therefore, only $V_k$ is feedback to the transmitter 202 to construct the pre-coding matrix W. That is, W is chosen for $$V_1^H W = [\Sigma_{t \times t_1} \quad 0 \quad \ldots \quad 0] \quad (13\text{-}1)$$

$$V_2^H W = [0 \quad \Sigma_{t \times t_2} \quad \ldots \quad 0] \quad (13\text{-}2)$$

$$\vdots$$

$$V_K^H W = [0 \quad \ldots \quad 0 \quad \Sigma_{t \times t_K}] \quad (13\text{-}K)$$

Denoting $$W = [W_1 \quad W_2 \quad \ldots \quad W_K] \quad (14)$$

where $W_k$ is a precoding matrix/vector applied to the input signals $s_k$ with a dimension of $(t \times t_k)$, and denoting $$\tilde{V}_k = [V_1^T \ldots V_{k-1}^T V_{k+1}^T \ldots V_K^T]^T \quad (15)$$

Thus, according to the constraint of equation (13-1) to (13-K), the matrix $W_k$ lies in the null space of $\tilde{V}_k$. By performing SVD for $\tilde{V}_k$, $$\tilde{V}_k = \tilde{S}_k \tilde{D}_k [\tilde{Q}hd\, k^{(0)} \tilde{Q}_k^{(1)}]^H \quad (16)$$

where $\tilde{Q}_k^0$ holds first rank($\tilde{V}_k$) right singular vectors. Performing SVD as $$V_k \tilde{Q}_k^{(1)} = S_k D_k [Q_k^{(0)} Q_k^{(1)}]^H \quad (17)$$

where $Q_k^0$ holds first rank($V_k \tilde{Q}_k^{(1)}$) right singular vectors. The precoding vectors are then calculated as $$W_k = \tilde{Q}_k^{(1)} Q_k^{(0)} \quad (18)$$

In an ideal case, the above equations force $W_k$ lying in the null space of $\tilde{V}_k$ to realize zero inter-user interference. However, as would be appreciated by a person skilled in the art, there is a constraint for the dimension of the antenna configuration, i.e. the number of transmission antennas must not be less than the total number of reception antennas (i.e. $t \geq r$).

Therefore, the inventors have recognised that for scenarios where $t < r$, by feeding back only the first $t_k$ columns of $V_k$ from each receiver, i.e. $\overline{V}_k = V_k(:,1:t_k)$, and then replacing $V_k$ with $\overline{V}_k$ in equation (16), a suitable precoding matrix may be computed. Therefore, the equations (13-1) to (13-K) are changed in example embodiments as $$V_1^H W = [\overline{V}_1 \quad \hat{V}_1]^H [W_1 \quad W_2 \quad \ldots \quad W_K] \quad (19\text{-}1)$$

$$= \begin{bmatrix} \Sigma_{t_1 \times t_1}^{(1)} & 0_{t_1 \times t_2} & \ldots & 0_{t_1 \times t_K} \\ \Sigma_{(t-t_1) \times t_1}^{(2)} & \Phi_{(t-t_1) \times t_2} & \ldots & \Phi_{(t-t_1) \times t_K} \end{bmatrix}$$

$$V_2^H W = [\overline{V}_2 \quad \hat{V}_2]^H [W_1 \quad W_2 \quad \ldots \quad W_K] \quad (19\text{-}2)$$

$$= \begin{bmatrix} 0_{t_2 \times t_1} & \Sigma_{t_2 \times t_2}^{(1)} & \ldots & 0_{t_2 \times t_K} \\ \Phi_{(t-t_2) \times t_1} & \Sigma_{(t-t_2) \times t_2}^{(2)} & \ldots & \Phi_{(t-t_2) \times t_K} \end{bmatrix}$$

$$\vdots$$

$$V_K^H W = [\overline{V}_K \quad \hat{V}_K]^H [W_1 \quad W_2 \quad \ldots \quad W_K] \quad (19\text{-}K)$$

$$= \begin{bmatrix} 0_{t_K \times t_1} & 0_{t_K \times t_2} & \ldots & \Sigma_{t_K \times t_K}^{(1)} \\ \Phi_{(t-t_K) \times t_1} & \Phi_{(t-t_K) \times t_2} & \ldots & \Sigma_{(t-t_K) \times t_K}^{(2)} \end{bmatrix}$$

Based on equations (19-1) to (19-K), the determinant interferences from other users may be eliminated for each user. Thus, the efficient channel has a structure like:

$$P^H H W = \begin{bmatrix} \Sigma_{t_1 \times t_1}^{(1)} & 0_{t_1 \times t_2} & \ldots & 0_{t_1 \times t_K} \\ \Sigma_{(r_1-t_1) \times t_1}^{(2)} & \Phi_{(r_1-t_1) \times t_2} & \ldots & \Phi_{(r_1-t_1) \times t_K} \\ 0_{t_2 \times t_1} & \Sigma_{t_2 \times t_2}^{(1)} & \ldots & 0_{t_2 \times t_K} \\ \Phi_{(r_2-t_2) \times t_1} & \Sigma_{(r_2-t_2) \times t_2}^{(2)} & \ldots & \Phi_{(r_2-t_2) \times t_K} \\ \vdots & \vdots & \vdots & \vdots \\ 0_{t_K \times t_1} & 0_{t_K \times t_2} & \ldots & \Sigma_{t_K \times t_K}^{(1)} \\ \Phi_{(r_K-t_K) \times t_1} & \Phi_{(r_K-t_K) \times t_2} & \ldots & \Sigma_{(r_K-t_K) \times t_K}^{(2)} \end{bmatrix} \quad (20)$$

Assuming that the transmission signals input to the transmitter 202 are denoted as $s = [s_1 \, s_2 \, \ldots \, s_K]^T$, and $s_k = [s_{k,1} \, \ldots \, s_{k,t_k}]^T$ ($k=1, \ldots K$) is denoted as the signal streams intended for the kth receiver, the channel output $y_k$ at each receiver is then expressed as $$y_k = P_k^H H_k W s + P_k^H z_k \quad (21)$$

$$= \begin{bmatrix} \Sigma_{t_k \times t_k}^{(1)} s_k \\ \Sigma_{(r_k-t_k) \times t_k}^{(2)} s_k + \sum_{j \neq k} \Phi_{(r_k-t_k) \times t_j} s_j \end{bmatrix} + \overline{z}_k$$

Using this channel optimization method of example embodiments, the multiuser MIMO system 200 can be decomposed to separate SU-MIMO systems approximately and only the corresponding signals intended for a particular receiver are detected and decoded in that receiver since the inter-user interference is effectively eliminated with the precoding weights.

For the described channel optimization method in an example embodiment, the right singular matrix $V_k$ of the channel matrix $H_k$, or one or more determinant columns of $V_k$ are quantized and fed back to the transmitter 202. Since this may result in feedback bandwidth usage, to reduce feedback overhead, other example embodiments may utilize codebooks and codebook searching techniques.

For a codebook based precoding matrix, the desired precoding matrix $W/W_k$ may be viewed as a point on the Grassmann manifold, G(N, M), which is a set of M-dimensional hyper-planes in an N-dimensional space. The Grassmann manifold G(N, M) may be quantized into equal portions. The different portions may be searched to determine in which portion $W/W_k$ is located and the corresponding index of the relevant portion may then be fed back to the transmitter 202. The codebook may be predefined using a Grassmanian design to contain a set of indexed matrices as codebook elements which have same dimensions as $W/W_k$. The codebook matrix which has the minimum distance to $W/W_k$ is selected and its corresponding index is fed back to the transmitter 202. The transmitter 202 then uses the codebook element identified by the transmitted index to form the pre-coding matrix for beamforming.

In closed-loop SU-MIMO systems, the desired precoding matrix is the right singular matrix of the channel matrix, i.e. $V_k$. Therefore, the receiver compares $V_k$ with a codebook of unitary matrices and then decides the codebook element used for precoding. In the closed-loop MU-MIMO system 200 in example embodiments, the desired precoding matrix is determined based on all the channels seen from each scheduled receiver e.g. 208, 210. Therefore, the desired precoding matrix for the MU-MIMO system 200 is determined at the transmitter 202 based on the channel feedback from each receiver e.g. 208, 210, rather than being determined at each receiver since there are no other receivers' channel information available in each receiver.

Based on the described MU-MIMO channel optimization with precoding, in example embodiments using codebook based precoding, a codebook of vectors and/or codebook of matrices is used for feedback of the determinant channel information. The determinant channel information is the first $t_k$ columns of $V_k$ in each receiver where $t_k$ is the number of spatial streams intended for the k th receiver. In such codebook based example embodiments, the transmitter 202 schedules the signals intended for each receiver and determines the precoding matrix used for the scheduled signals using the feedback channel information indicated by codebook element indices.

As described, for example embodiments using codebook based precoding, two broad categories of codebooks may be used. They are codebooks of matrices and codebooks of vectors. At the receivers e.g. 208, 210, the desired precoding vectors are computed using SVD. Each receiver feedbacks the first $t_k$ columns of its right singular matrix $V_k$, i.e. $\bar{V}_k$, based on a unitary codebook C where elements of the codebook $C_1, C_2, \ldots, C_L$ are all ($t \times t_k$) unitary matrices.

$\bar{V}_k$ is compared with elements of the codebook C to find a codebook element that is closest to it and an index corresponding to the codebook element is then identified for feedback transmission to the transmitter 202. For example, when $t_k=1$, the elements of the codebook C are ($t \times 1$) vectors and an index may be identified by:

$$i = \underset{\substack{i \\ C_i \in C}}{\arg\max} \|C_i' \bar{V}_k\| \tag{22}$$

When $t_k > 1$, the elements of the codebook C are matrices and an index may be identified by:

$$i = \underset{\substack{i \\ C_i \in C}}{\arg\min} \|\bar{V}_k - C_i\| \tag{23}$$

The i is the index of the codebook element closest to $\bar{V}_k$ and each receiver e.g. 208, 210 feedbacks i to the transmitter 202. The transmitter 202 utilizes the feedback matrices/vectors identified by the indices (e.g. equation (22) and/or (23)) to schedule the receivers e.g. 208, 210 with time-frequency resources and determines the precoding matrix for transmissions to the receivers e.g. 208, 210. For example, if one receiver $k_1$ feedbacks an index to identify a codebook element $C_m$ and another receiver $k_2$ feedbacks an index to identify another codebook element $C_n$, the two data signals at the transmitter 202 intended for these two receivers $k_1$ and $k_2$ can be scheduled in the same time-frequency resource using spatial multiplexing. Since codebook elements $C_m$ and $C_n$ are approximations of channels $\bar{V}_{k_1}$ and $\bar{V}_{k_2}$ respectively, $C_m$ and $C_n$ may be approximately considered as lying in the null spaces of $\bar{V}_{k_1}$ and $\bar{V}_{k_2}$ respectively due to the orthogonality between $C_m$ and $C_n$. Thus, $W=[C_m \ C_n]$ may be selected as the precoding matrix for channel optimization of MU-MIMO transmission for scheduled receiver $k_1$ and receiver $k_2$. At each receiver e.g. 208, 210, all transmitted signals are detected but only the relevant intended signals for the respective receiver are decoded.

Figure 7:
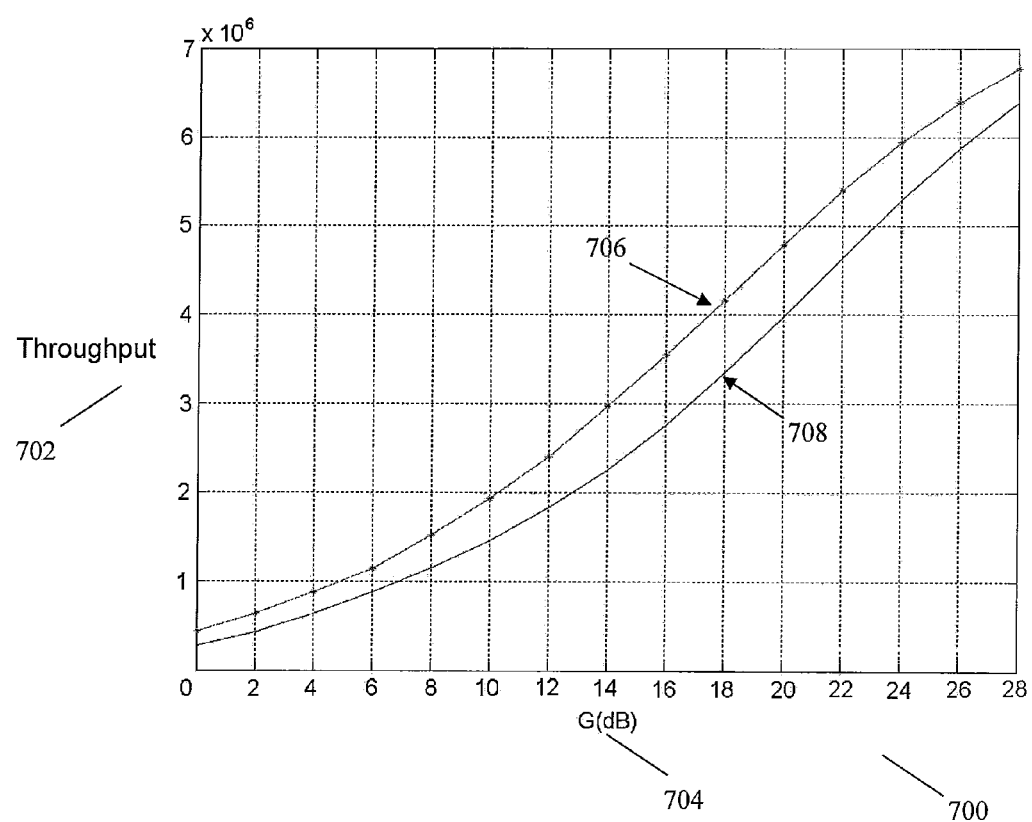
FIG. 7 is a graph of throughput vs Geometry illustrating throughput performance of an example embodiment.

FIG. 7 is a graph 700 of throughput 702 vs Geometry 704 illustrating a throughput performance comparison between an existing open-loop MU-MIMO system, and an example embodiment MU-MIMO system. Plot 706 illustrates the throughput performance of the example embodiment using codebook based precoding in a closed-loop MU-MIMO system. Plot 708 illustrates the throughput performance of a typical open-loop MU-MIMO system without precoding. The example embodiment and the typical MU-MIMO system are both 2×2 MIMO systems with 10 active receivers. By comparing plots 706 and 708, it can be seen that the example embodiment achieves system throughput performance gains of about 2 to 3 dB over the typical system.

As described, example embodiments may provide communication channel optimization in a wireless communication system utilizing multiple spatial channels by using precoding based on channel state information.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A transmission method in a multiple-input multiple-output (MIMO) communication system, the method comprising the steps of:
   receiving feedback data representing channel state information from respective receivers of the MIMO communication system;
   grouping the receivers into one or more groups based on the received feedback data;
   obtaining a precoding matrix for each group of receivers, wherein the precoding matrix is obtained based on the received feedback data such that precoding vectors or sub-matrices in the precoding matrix associated with respective receivers of said each group of receivers are orthogonal to each other; and
   applying the precoding matrix to input signals for transmission to said each group of receivers.

2. The method as claimed in claim 1, wherein the feedback data comprises one or more determinant columns of respective right singular matrices of channel matrices derived at the respective receivers.

3. The method as claimed in claim 2, further comprising determining numbers of streams, $t_k$, assigned to the respective receivers, and wherein the feedback data comprises the first $t_k$ columns of the right singular matrices derived at the respective receivers.

4. The method as claimed in claim 2, wherein t is a number of transmission antennas of a transmitter in the MIMO communication system, each said one or more groups comprise less than or equal to t receivers.

5. The method as claimed in claim 2, wherein the obtaining of the precoding matrix comprises computing the precoding vectors or sub-matrices for each receiver of each group as lying in the null space constructed using said one or more determinant columns of the respective right singular matrices derived at respective other receivers of said each group.

6. The method as claimed in claim 1, further comprising deriving respective right singular matrices of channel matrices at the respective receivers, comparing the derived right singular matrices with a codebook of matrices, determining codebook elements closest to the derived respective right singular matrices, and wherein the feedback data representing the channel state information comprises respective indices identifying the codebook elements.

7. The method as claimed in claim 6, further comprising determining numbers of streams, $t_k$, assigned to the respective receivers, and the codebook elements for the respective receivers are ($t \times t_k$) matrices, where t is the number of transmitter antennas in the MIMO communication system, and the first $t_k$ columns of the right singular matrices derived at the respective receivers are compared with the respective codebooks for determining the closest codebook elements.

8. The method as claimed in claim 7, wherein grouping the receivers and obtaining the precoding matrices for the respective groups comprises grouping receivers having orthogonal codebook elements identified therewith, and constructing the precoding matrix from the respective orthogonal codebook elements.

9. The method as claimed in claim 8, wherein t is a number of transmission antennas of a transmitter in the MIMO communication system, and each group of receivers comprises less than or equal to t receivers.

10. A transmitter for a multiple-input multiple-output (MIMO) communication system, the transmitter comprising,
 a control module for receiving feedback data representing channel state information from respective receivers of the MIMO communication system;
 a scheduler unit for grouping the receivers into one or more groups based on the received feedback data, said scheduler unit being capable of obtaining a precoding matrix for each group of receivers, wherein the precoding matrix is obtained based on the received feedback data such that precoding vectors or sub-matrices in the precoding matrix associated with respective receivers of said each group of receivers are orthogonal to each other; and
 a precoding module for applying the precoding matrix to input signals for transmission to said each group of receivers.

11. The transmitter as claimed in claim 10, wherein the feedback data comprises one or more determinant columns of respective right singular matrices of channel matrices derived at the respective receivers.

12. The transmitter as claimed in claim 11, wherein the scheduler unit determines numbers of streams, $t_k$, assigned to the respective receivers, and wherein the feedback data comprises the first $t_k$ columns of the right singular matrices derived at the respective receivers.

13. The transmitter as claimed in claim 11, wherein t is a number of transmission antennas of the transmitter, the scheduler unit groups the receivers into said one or more groups, each group comprising less than or equal to t receivers.

14. The transmitter as claimed in claim 11, wherein the obtaining of the precoding matrix comprises computing the precoding vectors or sub-matrices for each receiver of each group as lying in the null space constructed using said one or more determinant columns of the respective right singular matrices derived at respective other receivers of said each group.

15. The transmitter as claimed in claim 10, wherein the feedback data from each receiver representing the channel state information comprises an index identifying a codebook element in a codebook, and wherein said codebook element is determined as being closest to a right singular matrix of a channel matrix derived at said each receiver by comparing the derived right singular matrix with matrices in said codebook.

16. The transmitter as claimed in claim 15, wherein the scheduler unit determines numbers of streams, $t_k$, assigned to the respective receivers whereby the codebook elements for the respective receivers are ($t \times t_k$) matrices, where t is the number of transmitter antennas in the MIMO communication system, and the first $t_k$ columns of the right singular matrices derived at the respective receivers are compared with the respective codebooks for determining the closest codebook elements.

17. The transmitter as claimed in claim 16, wherein the scheduler unit groups receivers having orthogonal codebook elements identified therewith, and constructs the precoding matrix from the respective orthogonal codebook elements.

18. The transmitter as claimed in claim 17, wherein t is a number of transmission antennas of the transmitter in the MIMO communication system, and each group of receivers comprises less than or equal to t receivers.

19. A multiple-input multiple-output (MIMO) communication system, the MIMO communication system comprising,
 at least one transmitter;
 one or more receivers deriving feedback data from signals received from the at least one transmitter and transmitting the feedback data to the at least one transmitters;
 wherein each transmitter comprises,
  a control module for receiving the feedback data representing channel state information from respective receivers of the MIMO communication system;
  a scheduler unit for grouping the receivers into one or more groups based on the received feedback data, said scheduler unit being capable of obtaining a precoding matrix for each group of receivers, wherein the precoding matrix is obtained based on the received feedback data such that precoding vectors or sub-matrices in the precoding matrix associated with respective receivers of said each group of receivers are orthogonal to each other; and
  a precoding module for applying the precoding matrix to input signals for transmission to said each group of receivers.

20. The MIMO communication system as claimed in claim 19, wherein the feedback data comprises one or more determinant columns of respective right singular matrices of channel matrices derived at the respective receivers.

21. The MIMO communication system as claimed in claim 20, wherein the scheduler unit determines numbers of streams, $t_k$, assigned to the respective receivers, and wherein the feedback data comprises the first $t_k$ columns of the right singular matrices derived at the respective receivers.

22. The MIMO communication system as claimed in claim 20, wherein t is a number of transmission antennas of the transmitter, the scheduler unit groups the receivers into said one or more groups, each group comprising less than or equal to t receivers.

23. The MIMO communication system as claimed in claim 20, wherein the obtaining of the precoding matrix comprises computing the precoding vectors or sub-matrices for each receiver of each group as lying in the null space constructed using said one or more determinant columns of the respective right singular matrices derived at respective other receivers of said each group.

24. The MIMO communication system as claimed in claim 19, wherein the feedback data from each receiver representing the channel state information comprises an index identifying a codebook element in a codebook, and wherein said codebook element is determined as being closest to a right singular matrix of a channel matrix derived at said each receiver by comparing the derived right singular matrix with matrices in said codebook.

25. The MIMO communication system as claimed in claim 24, wherein the scheduler unit determines numbers of streams, $t_k$, assigned to the respective receivers whereby the codebook elements for the respective receivers are $(t \times t_k)$ matrices, where t is the number of transmitter antennas in the MIMO communication system, and the first $t_k$ columns of the right singular matrices derived at the respective receivers are compared with the respective codebooks for determining the closest codebook elements.

26. The MIMO communication system as claimed in claim 25, wherein the scheduler unit groups receivers having orthogonal codebook elements identified therewith, and constructs the precoding matrix from the respective orthogonal codebook elements.

27. The MIMO communication system as claimed in claim 26, wherein t is a number of transmission antennas of the transmitter in the MIMO communication system, and each group of receivers comprises less than or equal to t receivers.

* * * * *